(12) United States Patent
Jones

(10) Patent No.: US 10,557,679 B2
(45) Date of Patent: Feb. 11, 2020

(54) FIRE ALARM AND TOOL OILING SYSTEM

(71) Applicant: Timothy Lee Jones, Bourbonnais, IL (US)

(72) Inventor: Timothy Lee Jones, Bourbonnais, IL (US)

( * ) Notice: Subject to any disclaimer, the term of this patent is extended or adjusted under 35 U.S.C. 154(b) by 239 days.

(21) Appl. No.: 15/732,722

(22) Filed: Dec. 20, 2017

(65) Prior Publication Data

US 2018/0195827 A1    Jul. 12, 2018

Related U.S. Application Data

(60) Provisional application No. 62/438,047, filed on Dec. 22, 2016.

(51) Int. Cl.
| | |
|---|---|
| *B05B 7/00* | (2006.01) |
| *F41A 29/04* | (2006.01) |
| *F16N 7/34* | (2006.01) |
| *F41C 27/00* | (2006.01) |
| *B05B 7/24* | (2006.01) |
| *B05B 7/26* | (2006.01) |
| *B05C 7/02* | (2006.01) |
| *B05C 11/10* | (2006.01) |

(52) U.S. Cl.
CPC ............ *F41A 29/04* (2013.01); *B05B 7/2489* (2013.01); *B05B 7/2491* (2013.01); *B05B 7/262* (2013.01); *B05C 7/02* (2013.01); *B05C 11/1039* (2013.01); *F16N 7/34* (2013.01); *F41C 27/00* (2013.01)

(58) Field of Classification Search
CPC ... F41A 29/04; F16N 7/34; F16N 7/32; B21D 22/201; B05B 7/2489; B05B 7/2491; B05B 7/262; B05D 1/02; B05C 7/02; B05C 11/1039; B05C 15/00

See application file for complete search history.

(56) References Cited

U.S. PATENT DOCUMENTS

| | | | | |
|---|---|---|---|---|
| 3,736,902 A | * | 6/1973 | Glanzer | B21B 45/0251 118/50 |
| 4,089,295 A | * | 5/1978 | Thomson | B05B 16/00 118/316 |
| 4,724,155 A | * | 2/1988 | Bray | B05B 5/08 427/476 |
| 8,356,696 B1 | * | 1/2013 | Carroll | F16N 7/32 118/300 |
| 2006/0278256 A1 | * | 12/2006 | Biddy | F41A 29/00 134/34 |
| 2016/0184844 A1 | * | 6/2016 | Di Gioia | B05B 5/03 239/706 |

FOREIGN PATENT DOCUMENTS

JP         06106270 A    *  4/1994

* cited by examiner

*Primary Examiner* — Blake A Tankersley

(57) ABSTRACT

A firearm and tool oiling chamber comprised of an oil less air compressor, sealed chamber, oil atomizer and air filter. Said system introduces air through the oil atomizer breaking oil down to a fine vapor allowing the vapor to cover all surfaces of firearm or tool. As the vapor enters the chamber, being heavier than air it forces air out through the exhaust line and filter. Any escaping oil is caught in filter. The oil is able to cover all surfaces of firearm or tool and to penetrate into areas that hand oiling does not reach using much less oil than conventional methods.

3 Claims, 4 Drawing Sheets

FIRE ALARM AND TOOL OILING SYSTEM

This application claims priority to provisional patent application No. 62/438,047 filed Dec. 22, 2016

TECHNICAL FIELD

This invention relates to the field of oiling of firearms and small tools or anything that requires oiling maintenance by hand.

BACKGROUND OF THE INVENTION

Currently the standard of oiling firearms and small tools is to take a cleaning rag and dump oil onto rag and wipe the oil onto the surface of firearm or small tools. This process only covers the surface of firearm or tool where the rag will touch. The next step is to spray oil flooding the places that the rag cannot reach causing excess oil and dirt to build up. The rag and spray oil system wastes 2 times plus oil than necessary for maintenance of firearms or tools The present invention is provided to solve the problems discussed above and other problems caused by over oiling, and to provide advantages and aspects not provided by prior oiling systems. A full discussion of the features and advantages of the present invention is deferred to the following detailed description which proceeds with reference to the accompanying drawings.

SPECIFICATIONS OF INVENTION

While this invention is susceptible to embodiments in many different form, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. The present invention solves the problems of the prior methods by using less oil and allowing oil to penetrate to all surfaces inside and outside of firearm or tool that are not accessible with rag and spray oil methods. Said device is comprised of an electric oil less air compressor, a set of air valves, a round chamber, two sealed end caps, an exhaust filter to capture escaping oil vapor and a oil atomizer to break down the oil to a fine vapor. By turning the air compressor on air will pump through the oil atomizer filling the chamber with a fine oil vapor which in turn pushes clean air out of the chamber through the filter. The filter catches any escaping oil vapor. The chamber being round keeps the oil turning through and around the firearm or tool allowing it to penetrate all surfaces. The pump is run for 60 seconds, off for 3 minutes for three cycles then off for 15 minutes before opening chamber to allow all vapor to settle. Chamber can now be opened and firearm or tool can be wiped down.

Other features and advantages of the invention will be apparent from the following specifications taken in conjunction with the drawings.

DETAILED SPECIFICATION OF THE INVENTION

Figure 1:
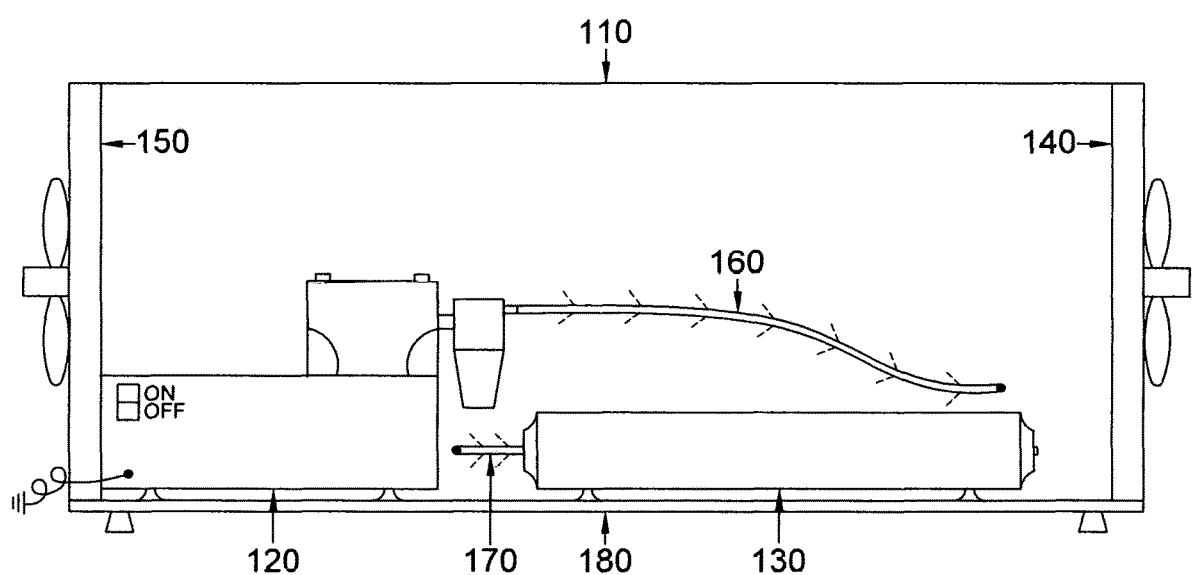
FIG. 1 is a perspective view of the invention showing the chamber, pump and filter and view of connecting lines

While this invention is susceptible of embodiments in many different forms, there is shown In the drawings and will here in be described in detail preferred embodiments of the invention with the understanding that the present disclosure is to be considered as an exemplification of the principles of the invention and is not intended to limit the broad aspect of the invention to the embodiments illustrated.

As illustrated in FIG. 1, in accordance with one or more embodiments of the present invention shows the exterior of assembled unit 110 being the chamber, 140 being the right removable end cap, 120 being the oil less air compressor connected to 160 the inlet air tube that delivers air to the inside of the chamber, 170 being the exhaust air line from chamber 110 to 130 the inline air filter. 110, 120, and 130 attached to base 180.

Figure 2:
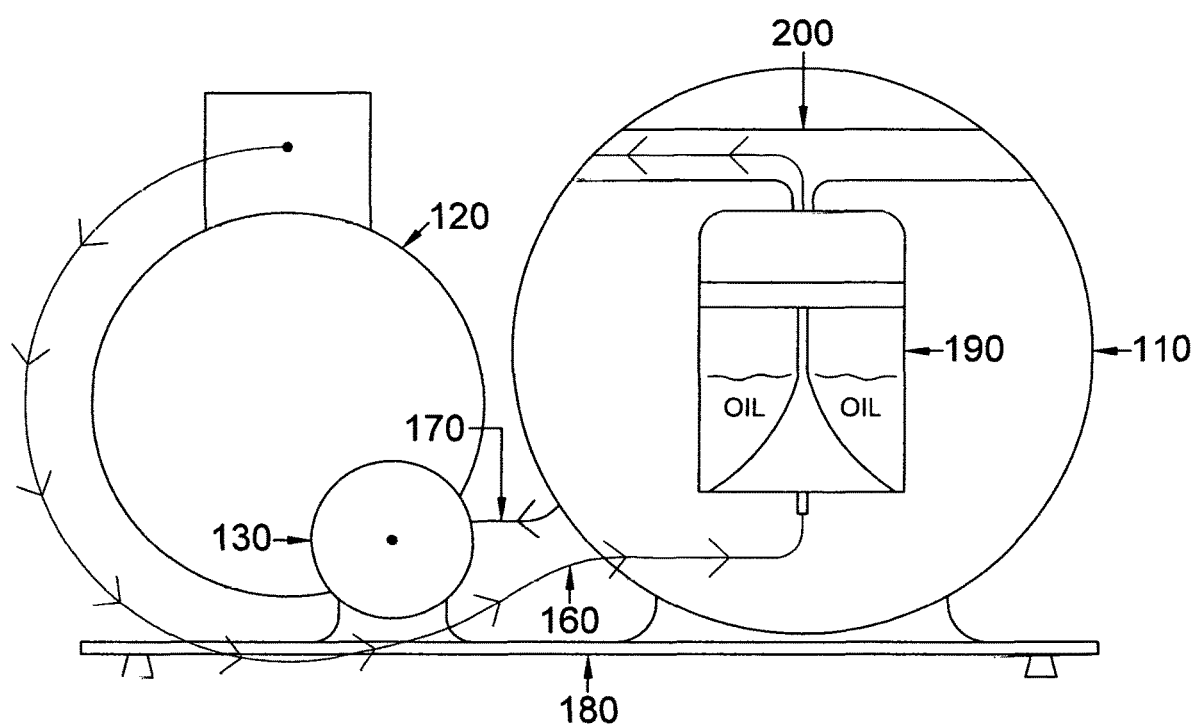
FIG. 2 is placement of the oil atomizer inside of the chamber

As illustrated in FIG. 2, in accordance with one or more embodiments of the present of the present invention shows the end of unit chamber 110 without end cap 140. With oil less air compressor running, air runs through in let air tube 160 into oil atomizer 190 allowing oil to vapor through oil vapor delivery tube 200 directing vapor into chamber 110. Excess vapor and clean air removed through line 170 air filter 130 to remove exhaust vapor. All components attached to base 180.

Figure 3:
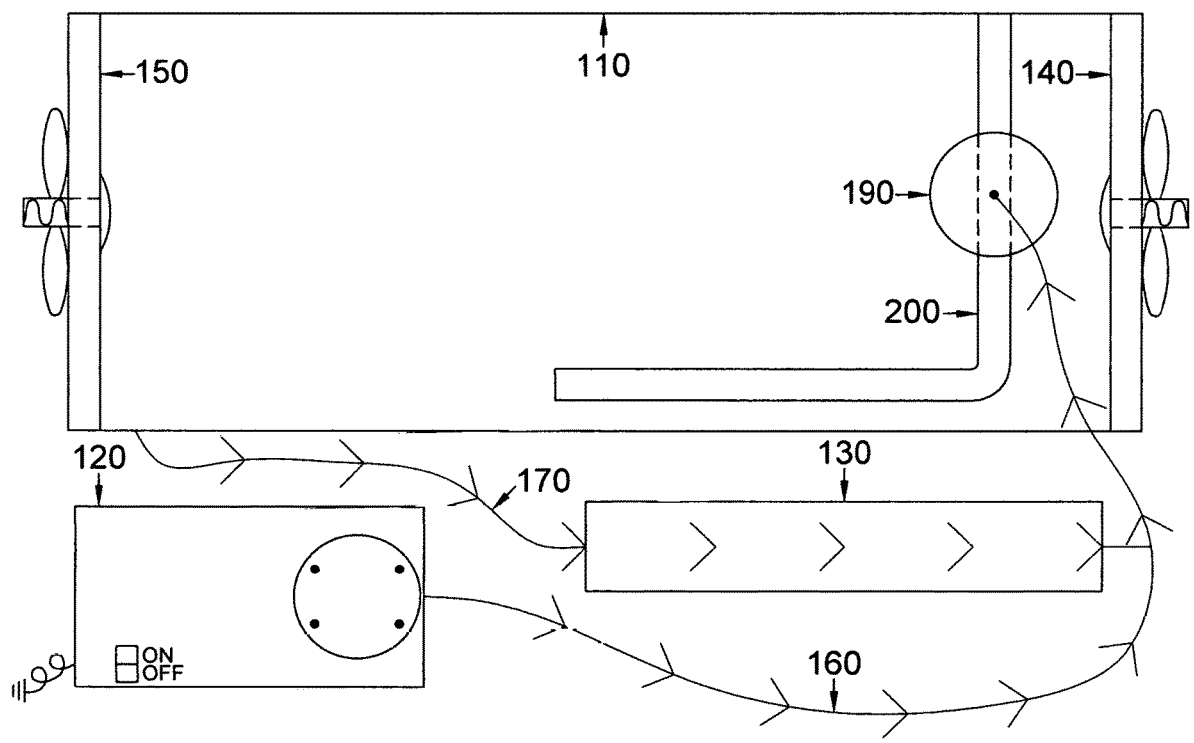
FIG. 3 is a cutaway view from above the chamber showing interior of chamber and placement of atomizer, filter and pump.

As illustrated in FIG. 3, in accordance with one or more embodiments of the present invention shows 120 pump on with air going into 160 air tube to 190 oil atomizer directing oil vapor into 200 delivery line to chamber 110. Chamber closed at both ends by 140 and 150 sealed end caps. Excess vapor exiting through line 170 and 130 filter.

Figure 4:
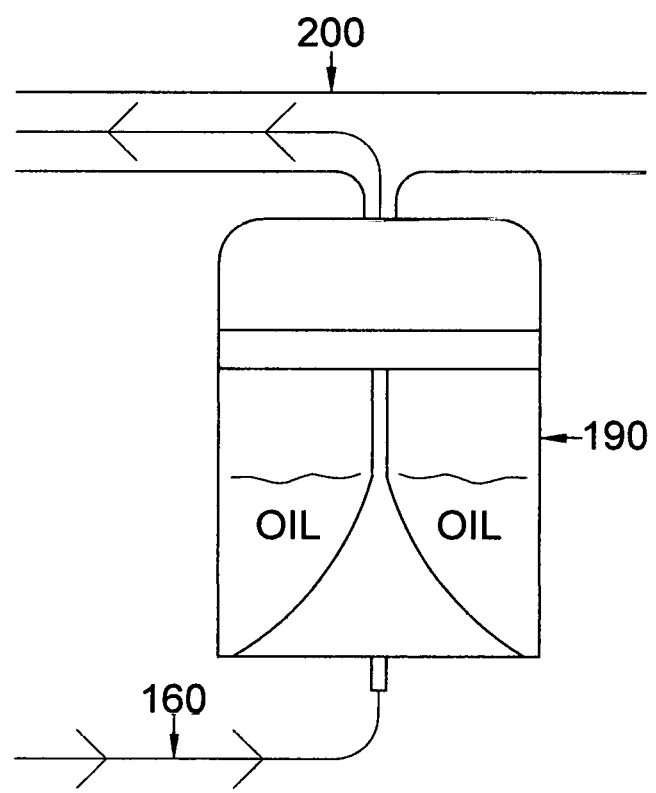
FIG. 4 is perspective view of oil atomizer

As illustrated in FIG. 4, in accordance with one or more embodiments of the present invention shows 190 oil atomizer positioned between 160 inlet line and 200 delivery line. When oil atomizer to be used 1 ounce of oil is added to atomizer approximately every third usage.

While the specific embodiments have been illustrated and described, numerous modifications come to mind without significantly departing from the spirit of the invention and the scope of protection is only limited by the scope of the accompanying Claims Air filter is attached to base with two open faced spring clamps that are screwed in place through bottom of base. Rubber tubing is attached to air compressor with a barbed fitting and secured in place with a spring clamp, this tubing is then run through side of chamber through sealed hole and attached to oil atomizer with formed rubber elbow and a spring clamp. Oil atomizer is attached to side wall of chamber with a stationary bracket. Chamber delivery tube is attached to oil atomizer with a plastic elbow with barbed end, Chamber exhaust tube is inserted through side wall of chamber at opposite end of chamber from intake tube and run to filter being attached to filter with a slide lock clamp built into filter.

What is claimed is:
1. A firearm and tool oiling system comprising:
an oil less air compressor;
a chamber with two end caps;
an air filter;
an oil atomizer provided in the chamber;
a base to which the oil less air compressor, the chamber, and the air filter are attached;

an air compressor tubing which runs from the oil less air compressor to an interior of the chamber where the air compressor tubing connects to an inlet of the oil atomizer;

a chamber delivery hose provided inside the chamber, connected to an outlet of the oil atomizer, and which is configured to deliver atomized oil to the interior of the chamber; and a chamber exhaust tubing which runs from the chamber to the air filter and which is configured to exhaust air from the chamber, wherein the two end caps of the chamber seal the chamber and at least one of the two end caps is configured to open relative to the chamber to allow the firearm or the tool to be placed inside the chamber to be oiled.

2. The oiling system of claim 1, wherein the base has four rubber feet to eliminate vibrations, and wherein a first hook and loop strap is inserted through first slots in the base and wrapped around the oil less air compressor to attach the oil less air compressor to the base.

3. The oiling system of claim 2 wherein the chamber is attached to the base using a second hook and loop strap.

* * * * *

UNITED STATES PATENT AND TRADEMARK OFFICE
CERTIFICATE OF CORRECTION

Page 1 of 1

PATENT NO. : 10,557,679 B2
APPLICATION NO. : 15/732722
DATED : February 11, 2020
INVENTOR(S) : Timothy Lee Jones It is certified that error appears in the above-identified patent and that said Letters Patent is hereby corrected as shown below:

On the Title Page

Item (54) and in the Specification, Column 1 the Title of the invention is incorrect. Item (54) and Column 1 should read:
–Fire Arm and Tool Oiling System–

Signed and Sealed this
Fifteenth Day of September, 2020

Andrei Iancu
*Director of the United States Patent and Trademark Office*